(12) United States Patent
Jaynes

(10) Patent No.: US 6,924,026 B2
(45) Date of Patent: Aug. 2, 2005

(54) FOIL LAMINATE CREDIT CARD AND METHOD OF PRODUCING FOIL LAMINATE CREDIT CARD WITH DOUBLE-SIDED PRINTING

(75) Inventor: Dennis E. Jaynes, Huntley, IL (US)

(73) Assignee: Jet Lithocolor, Inc., Downers Grove, IL (US)

( * ) Notice: Subject to any disclaimer, the term of this patent is extended or adjusted under 35 U.S.C. 154(b) by 112 days.

(21) Appl. No.: 10/277,333

(22) Filed: Oct. 22, 2002

(65) Prior Publication Data

US 2004/0076803 A1 Apr. 22, 2004

Related U.S. Application Data

(63) Continuation-in-part of application No. 09/704,976, filed on Nov. 2, 2000, now Pat. No. 6,491,782.

(51) Int. Cl.[7] .............................. B32B 3/00; B32B 7/14

(52) U.S. Cl. ....................... 428/201; 428/209; 428/213; 428/457; 428/500

(58) Field of Search ................................ 428/201, 209, 428/213, 457, 500

(56) References Cited

U.S. PATENT DOCUMENTS 5,653,844 A * 8/1997 Abrams ...................... 156/277

* cited by examiner

Primary Examiner—B. Shewareged
(74) Attorney, Agent, or Firm—Leon I. Edelson, Esq.

(57) ABSTRACT

The present invention relates to a multi-surfaced foil laminate comprising an improved credit card and identification card having printed indicia visible on both sides through a clear plastic over-laminating film, the foil laminate comprising two printed surfaces, both surfaces printed by conventional lithography offset halftone printing. Alternative embodiments comprise a foil laminate with a printed metal foil outside surface and a printed plastic film outside surface and a foil laminate with two printed foil outside surfaces.

14 Claims, 3 Drawing Sheets

FOIL LAMINATE CREDIT CARD AND METHOD OF PRODUCING FOIL LAMINATE CREDIT CARD WITH DOUBLE-SIDED PRINTING

This is a continuation-in-part application of U.S. application Ser. No. 09/704,976 filed Nov. 2, 2000, now patented as U.S. Pat. No. 6,491,782 B1

FIELD OF THE INVENTION

The present invention relates to a multi-surfaced foil laminate comprising an improved credit card having at least two surfaces, both surfaces printed on one side and serving as outside surfaces providing identifying indicia through an exterior transparent plastic film, and the method of making the foil laminate with two printed surfaces, the printing being by conventional offset half tone lithography printing. The invention is also directed to a novel multi-surfaced credit card foil laminate having two outside surfaces fused together with over-laminating film and provided with printing on both sides of the foil laminate credit card or identification card.

The use of foil laminates, which possess an external clear plastic surface to protect a printed surface and identifying indicia, is well known. The attractiveness of a metallic surface is generally recognized but such surfaces with printed indicia are subject to erosion with normal use without protective covering. Typical applications are credit cards, identification cards and similar uses.

BACKGROUND OF THE INVENTION

The use of foil laminates, which possess an external clear plastic surface to protect a printed surface and identifying indicia, is well known. The attractiveness of a metallic surface is generally recognized but such metal surfaces with printed indicia are subject to smearing, smudging, or distortion of the wet ink as the printed metallic surfaces are handled during printing and further processing. In the prior art, metallic foil is taught as a laminate with an exterior plastic surface, which serves as the printing surface and as a protective outer surface. Reverse printing of the plastic surface which protects the metallic foil is used to provide print indicia on the inside of the plastic surface adjacent to the surface of the metallic foil, to avoid printing directly on the metallic foil.

DESCRIPTION OF THE PRIOR ART

Laminates with double-sided printing are known in the prior art. U.S. Pat. No. 5,653,844 teaches a method of double-sided printing on both surfaces of an outer surface of a foil laminate. The method of double-sided printing includes initially printing on the first side of an outer surface of a plastic film material wherein the printing is imparted to the side or surface of the plastic film material facing towards an underlying metallic foil to which it is to be adhered and the printing is applied to the plastic film material through the intermediary of either reverse or other suitable halftone color printing. Subsequently, the plastic material is bonded at the printed surface to the underlying metallic foil and a further printing is applied to the exterior surface of the outer plastic film surface. Thermal transfer printing is applied so as to not form any impressions on the foil laminate.

It is known to apply a clear vinyl film such as PVC over the printing on a vinyl core such as PVC under heat and pressure in a hydraulic laminating press. U.S. Pat. No. 4,897,533 teaches a method of preparing a credit card with a printed metallic surface protected by a transparent plastic film, which is bonded to the metal containing surface by a heat-activated adhesive, the metallic surface in the form of metal foil bonded to a plastic substrate under the application of heat and pressure in a hydraulic laminating press. U.S. Pat. No. 4,897,533 teaches the method of printing upon the metallic foil is by silk-screen printing with ultraviolet curable ink, the ink being cured immediately upon application of ultraviolet light. The use of conventional offset lithography printing is taught as not practical, especially in an automated process since the details of the graphics tend to blur and the processing of a plastic substrate with a metallized surface is problematical and unpredictable in results because the laminate in effect becomes a capacitor for storing static electricity generated during processing such as printing. U.S. Pat. No. 4,897,533 teaches that problems in breakage of the thin metalized surface and/or lack of clarity can be encountered in the application of a protective film over a metallic surface applied on the plastic core of a credit card.

It is an object of this invention to provide a credit card and a method of making a credit card as a double sided multiple surface double printed laminate credit card or identification card which provides an attractive metal surface with printed indicia which printing is protected against erosion and normal usage by a transparent plastic film.

It is an object of this invention to provide a credit card and a method of making a credit card as a double sided multiple surface double printed laminate credit card, gift card or identification card using conventional offset lithographic printing on a metal foil—plastic surfaced laminate and on a plastic film substrate, which are collated to form the double-sided multiple surface double printed laminate credit card.

It is an object of this invention to provide a double sided multiple laminate as an alternative credit card or identification card and method for preparing an alternative double sided multiple surface double printed laminate credit card or identification card using conventional offset half tone lithography printing on a metal foil-plastic surfaced laminate and on a plastic film substrate, the metal foil-plastic laminate with printing on the metal foil and the printed plastic film substrate being collated and laminated together to form the double sided multiple surface double printed laminate credit card.

It is an object of this invention to provide a double sided multiple laminate as an alternative credit card and a method of making an alternative double sided multiple surface double foil printed laminate credit card which provides two attractive metal surfaces with printed indicia which printing is protected against erosion and normal usage by a transparent plastic film.

It is an object of this invention to provide a double sided multiple laminate as an alternative credit card and a method of making a credit card as a double sided multiple surface double foil printed laminate credit card using conventional offset lithographic printing on metal foil-plastic surfaced laminates to provide two attractive metal surfaces with printed indicia by conventional offset lithographic printing which are collated to form the double-sided multiple surface double foil printed laminate credit card.

It is an object of this invention to provide a double sided double printed multiple surface and laminate as an alternative credit card using conventional offset lithographic printing on a plastic film substrate and on a metal foil adhered to the plastic film substrate by a suitable adhesive, the multiple surface consisting essentially of the printed PVC film substrate and printed metal foil adhering thereto being laminated over with an over-laminating PVC film.

It is an object of this invention to provide a method for preparing a double sided double printed multiple surface and laminate as an alternative credit card using conventional offset lithographic printing on a plastic film substrate and on a metal foil adhered to the plastic film substrate by a suitable adhesive, the multiple surface consisting essentially of the printed PVC film substrate and the printed metal foil adhering thereto being laminated over with an over-laminating PVC film.

SUMMARY OF THE INVENTION

This invention relates to an improved credit card and the method of making the card as a multi-surfaced foil laminate having at least two printed surfaces, a first surface consisting of a printed metal foil upon a plastic film substrate, a second printed surface comprising a printed plastic film, the first printed surface consisting of a printed metal foil upon a plastic film substrate and comprising a laminate, the two surfaces, the first comprising a laminate, the second comprising a printed plastic film, being collated together and laminated together to form a multi-surfaced foil laminate. This invention relates to the process for preparing the multi-surfaced foil upon a plastic film substrate laminate with two printed surfaces, one surface comprising a printed metal foil upon a plastic film substrate and one surface comprising a printed plastic film, the printing by conventional offset half tone lithography printing, and to the multi-surfaced foil laminate prepared thereby.

This invention also relates to an improved credit or identification card and the method of making the card as a multi-surfaced foil laminate having at least two printed surfaces, each printed surface consisting of a printed metal foil adhering to a plastic film substrate, each printed surface consisting of a printed metal foil upon a plastic film substrate and comprising a laminate, the two laminate surfaces being collated together and laminated together to form a third multi-surfaced foil laminate. The invention also relates to the process for preparing the printed foil surface upon a plastic film substrate to form a multi-layered foil laminate with two printed surfaces, each surface comprising a printed metal foil upon a plastic film substrate, the printing by conventional offset half tone lithography printing and to the multi-surfaced foil laminate prepared thereby.

This invention also relates to an improved credit card and the method of making the card as a double sided double printed multiple surface and laminate credit card, the multiple surface consisting of a printed PVC substrate and a printed metal foil adhered to the second side of the printed PVC substrate by a suitable adhesive, the printing being by conventional offset half tone lithography printing, the printed PVC film substrate and the printed metal foil adhering thereto being laminated over with an over-laminating PVC film.

DETAILS OF THE INVENTION

Figure 1:
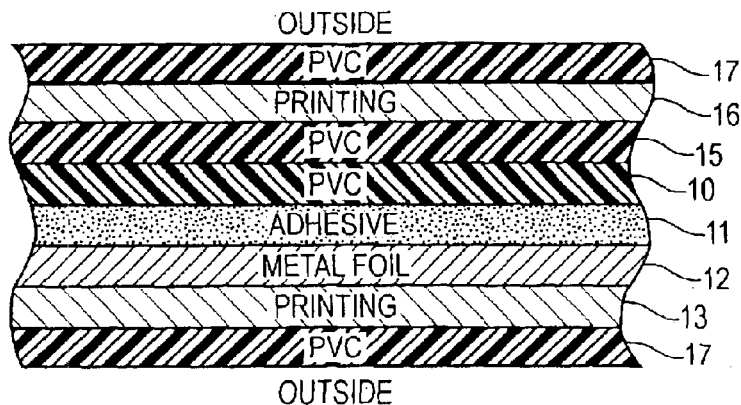
FIG. 1 is a cross-sectional view of an embodiment of the multi-surface foil credit card laminate of the present invention having at least two printed surfaces, one surface of printed PVC, one surface of printed metal foil.

Referring now to the drawings, FIG. 1 is a cross-sectional view of the multi-surfaced unitary foil laminate credit card wherein the thickness of the foil laminate has been enlarged for illustration purposes. The unitary foil laminate with two printed surfaces comprises two substrates, each with printed indicia which are laminated together to form a single unitary product. The foil laminate consists of a plastic printed stock of 13 mil PVC, 15 and printing 16, and a metal foil 12 with heat activation adhesive 11 laminated to plastic stock 10, of 13 mil PVC, which form the two substrates. The two substrates are laminated together with over-laminating film, 17, which is a transparent PVC film of overall thickness from 1 to about 6 mil, preferably about 2 mil. The printing is by conventional offset half tone lithography on a sheet fed press. The over-laminating film may have a magnetic foil applied on the inside of the film. Thus, the two printed surfaces have clear transparent scratch-resistant protective surfaces over the printed indicia.

Figure 2:
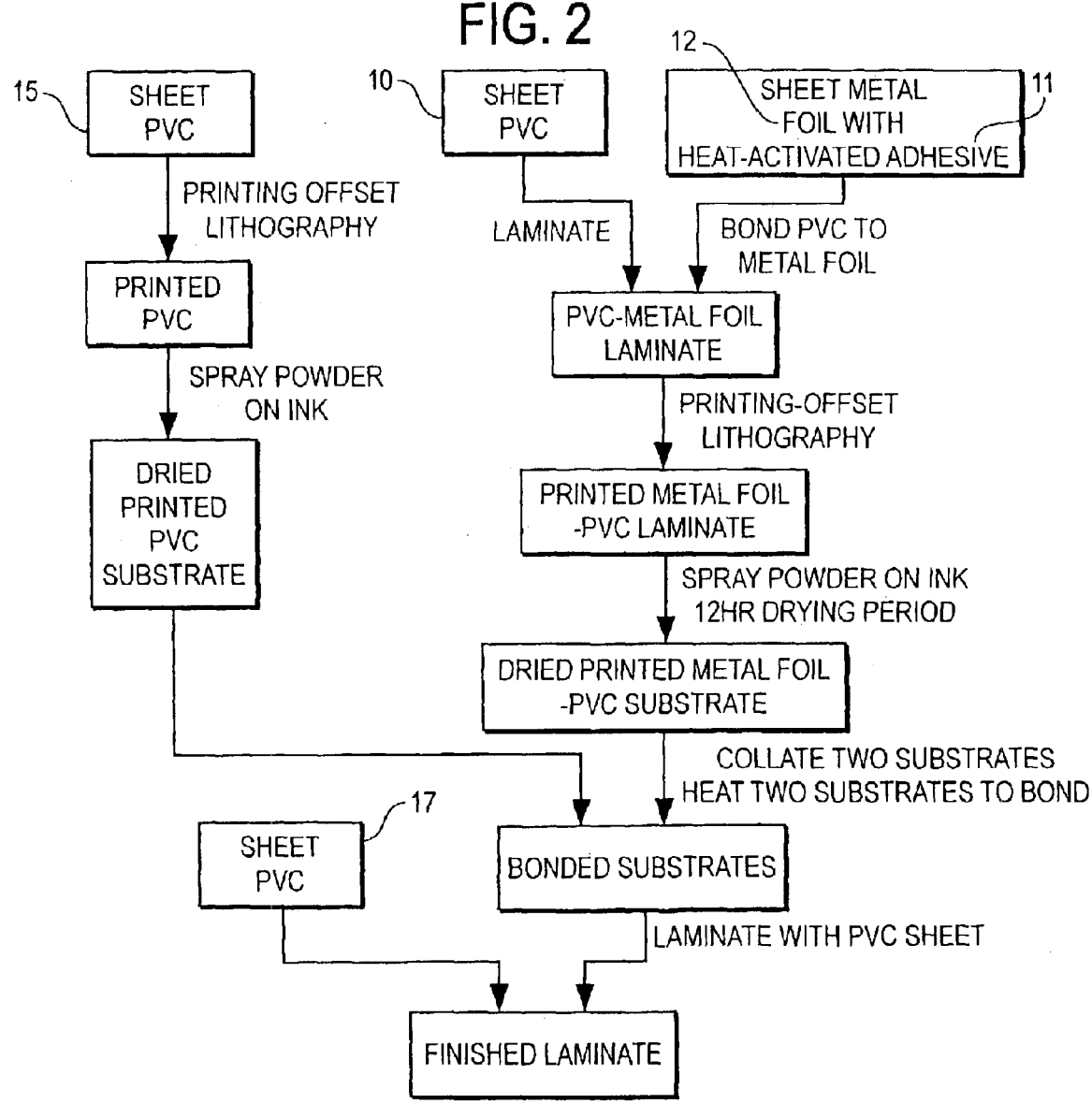
FIG. 2 is a block diagram representing the steps of an embodiment of the present invention for producing a multi-surfaced foil credit card laminate having at least two printed surfaces, one surface of printed PVC, one surface of printed metal foil.

The method of making the unitary foil laminate with two printed surfaces protected by a clear transparent scratch resistant protection surface is shown in FIG. 2, which comprises the steps of providing a first plastic substrate 10 of PVC, providing the metal foil 12 with the heat-activated adhesive as a surface adhered to the metal foil as 11 and providing printed indicia 13 on metal foil 12, followed by providing a second plastic substrate 15 of PVC and providing printed indicia 16 on plastic substrate 15. The substrate comprising 10, 11, 12 and 13 embody a separate laminate with printing 13 on a metallic foil 12. The two substrates are collated and laminated together with over-laminating film 17 of PVC preferably 2 mil. The plastic substrates and metal foil are in the form of large sheets of the thickness described. Multiple printed indicia are printed upon the substrates. A plurality of individual foil laminates can be die cut to card size from the large laminated sheets after the over-laminating film 17 is applied. The individual cards can be further finished by embossing, application of signature panels or holograms, etc., including embossing each segment with an applied scratch off or "ultra-graphic indicia" to enhance appearance or utility.

The substrate PVC sheet 15 and the substrate metal foil 17 as a laminate surface adhering to PVC sheet 10 by adhesive 11 are printed separately using a conventional offset lithography process. The metal foil is initially provided as a continuous sheet or web from a suitable supply roll or the like which has one surface of the sheet provided with a suitable adhesive so as to adhesively contact and be bonded to the plastic substrate, preferably a clean PVC film of 13 mil thickness to provide support for the metal foil without cracking during the printing step. The PVC film, in turn, is adapted to be bonded to the metal foil by possessing a dyne level of 36 or more above the energy level and a surface roughness measured in microinches by an RA meter of within the range of 30 to 100 RA, defined as roughness average of the surface of the plastic, measured with a RA meter (roughness meter), as well-understood in the plastics industry.

Examples of suitable metal foil include aluminum foil sheets manufactured under the trade name Spectratec® by the Rainbow Holosheen Company®. The foregoing metal foil sheets have a thickness of approximately one (1) mil, preferably from about 0.05 mm to about 1.5 mm. It will be appreciated that foils of different materials, such as gold or silver or bronze, and having a different thickness are contemplated for use in the present invention. The adhesive coatings are activated within a temperature range of from 110° F. to 200° F. Typical adhesives are formulated for adherence for designated plastic substrates such as PVC, which requires specific adhesive properties. It is accordingly preferable that the metal foil has a suitable adhesive coating for the substrate, which in this invention is PVC. Preferably, to thickness of the foil with adhesive is of the order of approximately one (1) mil.

Examples of suitable PVC film sheets include PVC film sheets manufactured under the trademarks Nanya® or Empire®. Thickness is preferably within a range of from 8 to 24 mil more preferably about 13 mil and with specified surface roughness to provide or improve printability.

An ink to be satisfactory for printing metal foils on plastic substrates must form a clear, sharp print with good covering power, adhere tenaciously to the metal foil and withstand the wrinkling and creasing to which the metal foil may be subjected during processing. It is preferable that the ink be of such nature as not to require excessive heat or prolonged exposure to heat to effect satisfactory adherence to the metal foil by the ink since prolonged exposure to heat or excessive heat can cause the plastic substrate to deform or otherwise distort. A suitable ink includes ink manufactured by Superior® which has the required high tack, low wax content and imparts sufficient free energy to the smooth surface to form an adequate adhesive bond, not only under wet conditions but when the ink is thoroughly dry and the print has aged. Other suitable inks include inks manufactured by Handschy®, which also provide the high tack, low wax requirements. Similar inks are required for printing on the PVC film sheets, which also require characteristics of high tack, low wax and are suitable for printing on PVC film.

The over-laminating PVC film for laminating the two surfaces can include over-laminating PVC sheets manufactured by Empire® or Nanya® wherein the film thickness is within the range of from 1 mil to about 6 mil preferably about 2 mil. The over-laminating PVC film is preferably clear, transparent and has the necessary properties of being heat-sealable, is durable at the heat seal as well as durable over the complete film, has low permeability to oxygen, carbon dioxide and gases in general and is a material that has strength and flexibility at both room temperature and low temperature.

The method of making the multi-surfaced foil laminate having at least two surfaces is shown in FIG. 2 in a block diagram of the preparation of a metal foil card with a metallic surface on one side and a standard PVC plastic film on the other side using standard offset half tone lithography printing on a sheet fed press and finished with standard methods at temperatures within the range of from 290° F. to 310° F. with polished plates in the laminating step with a short dwell of time of from 6 to 8 minutes under pressure of 800 to 1500 p.s.i.

Referring now to FIG. 2, where the drawing is for the purpose of illustrating an embodiment of the invention and not for the purpose of limiting the invention, FIG. 2 shows a block diagram illustrating the basic steps of the method of making an embodiment of the present invented credit card.

Referring to the steps of preparing the printed metal foil on the PVC substrate, a metal foil sheet 12 with one surface of the metal foil provided with a suitable heat-actuated adhesive is secured and bonded to sheet medium 10 with a roll laminator at a temperature within the range of from 110° F. to about 200° F. As noted, the PVC comprising sheet medium 10 must have a dyne level of 36 or above with an RA of 30 to 100, to provide a suitable substrate for metal foil adherence.

The PVC-metal foil laminate is advanced to a conventional sheet fed offset half tone lithography printing press to print indicia upon the metal foil surface of the laminate. The indicia may be in colored halftones or solid and may also include a further color or print surface therebeneath forming a colorated or contrasting background, for instance, such as white or any other suitable color. The ink, as noted, must be a high tack, low wax PVC ink to apply a four-color image on top of the metal foil laminate to yield a printed metal foil sheet. This printing process is performed by utilizing cyan, magenta, yellow and black separations and plates. The preferred ink hues are cyan 20–32, magenta 44–55, yellow 6–11, gray-C/M/Y-16 or under, in order that the color reproduction will match the original color of the artwork. Standard offset plates with 133 to 300 line screen, curved to compensate for excess dot gain by 17% are preferable to reproduce the original indicia on the metal foil to avoid excess dot gain at standard densities. Conductivity of the water used in the offset lithography printing is preferably within the range of from about 2000 to 3000 mhos per centimeter to print on metal foil as a fountain solution (water). Conductivity over 3600 or 4400 mhos per centimeter can prevent printing or drying printed indicia on metal foil. The form rollers are preferably not in excess of 35 durometers. Otherwise, the printed indicia can indicate excess dot gain, color streaks, and poor color reproduction with excess plate wear with overall inadequate reproduction of the original. The compressible blankets are preferably packed at 1 mil under the bearers to obtain print quality and to avoid too much dot gain and broken image areas on the metal foil. To obtain the required color and detail of the imprint on the metal foil, the preferable dot gain is 175 line screen under 31 cyan/under 31 magenta/under 29 yellow/under 33K/under 33 P.M.C., and ink film thickness via densitometer is preferably cyan 1.00–1.30/magenta 1.10–1.40/yellow 0.80–1.10/black 1.35–1.70. Examples of suitable printing presses include the Heidelberg Speedmaster offset printer (model nos. 72S+L and 102 S+L). It will be appreciated that printing processes other than a four color ink printing processes are also suitable, including printing processes which use fewer or greater numbers of ink colors.

Immediately after the printing step, it is essential that spray powder, 35 microns diameter or larger is coated upon the printed surfaces to dry into the ink so the printed surfaces will not develop ink offset, pick or have poor print quality.

The essential application of the spray powder allows the printed sheets to be handled and processed without risks of smudging, smearing or distorting the inks during a suitable drying period of approximately twelve hours or less depending upon ambient humidity and temperature which can be modified by conventional procedures without departing from the scope of the invention defined in the appended claims. The spray powder essentially provides a thin surface between the top surface of one powdered sheet and the bottom surface of a powdered sheet stacked thereupon. This surface allows for easy handling of stacked sheets. The spray powder prevents wet inks from sticking or adhering to the bottom surface of a powdered sheet stacked thereupon. The spray powder enables the ink to dry. The air dries the ink, the powder used to separate the sheets and prevent them from sticking. A preferred spray powder is a spray powder manufactured by Vam Products Company, Inc., of Oakland, N.J., and sold under the product name Anti Set-Off Powders® No. R-23). This powder is comprised of starch. It will be appreciated that other spray powders with similar properties are suitable as well.

Referring to the steps of preparing a printed PVC sheet as illustrated in FIG. 2, PVC sheet 15 is printed by offset half tone lithography on a conventional offset lithography sheet fed separations and plates as already described, followed by spraying powder and drying the print ink as indicated, to prepare print surface 16 on PVC substrate 15. Referring further to FIG. 2, the two substrates, PVC sheet 10 with adhesive 11, metal foil 12, and printing 13 as a separate substrate, and sheet 15 with printing 16 thereon, as a second substrate, are collated and bonded together on the PVC sides.

As an additional step, which may be preferable, an application of a heat activated adhesive as a dry-bond adhesive to at least one PVC side of the two substrates aids bonding of the two substrates. Bonding is accomplished in a laminating press under the application of heat and pressure at 290° F. to 310° F. with pressure of about 1000 p.s.i., for example, with an over-laminating clear PVC 2 mil film with a 6 minute dwell time under pressure. The over-laminating film can have an identification magnetic foil applied on the inside of the film. The laminate is die cut to required size and finished by embossing or further post processing as required.

Figure 3:
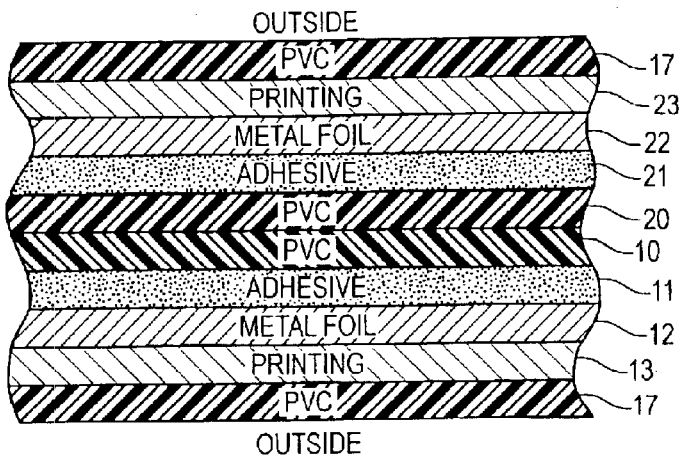
FIG. 3 is a cross-sectional view of an embodiment of the multi-surface foil credit card laminate of the present invention having at least two printed surfaces, each surface of printed metal foil.
Figure 4:
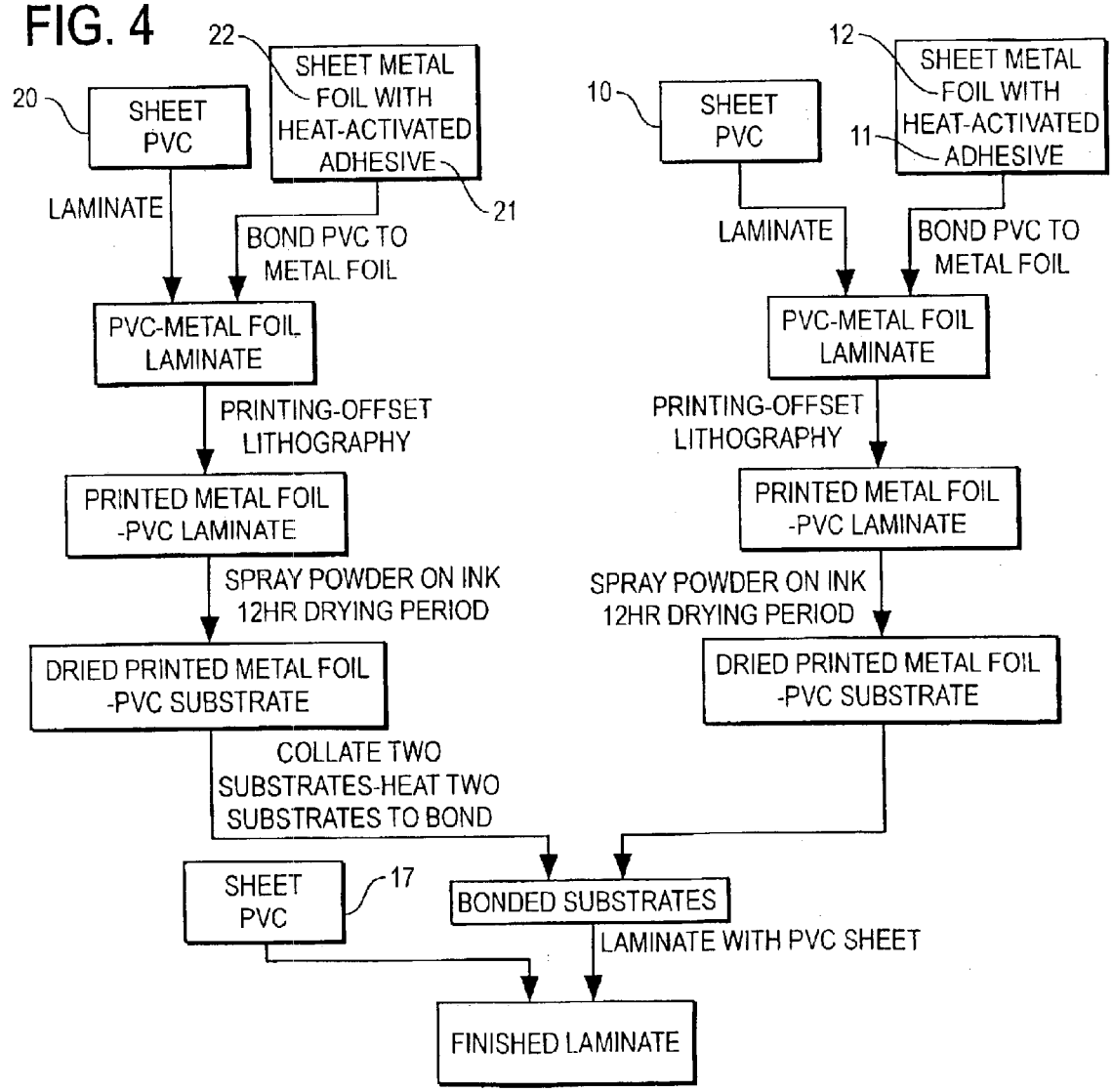
FIG. 4 is a block diagram representing the steps of an embodiment of the present invention for producing a multi-surfaced foil laminate having at least two printed surfaces, each surface of printed metal foil.

Referring now to drawings, FIGS. 3 and 4, FIG. 3 is a cross-sectional view of the multi-surfaced dual foil laminate credit card wherein the thickness of the foil laminate has been enlarged for illustration purposes. The foil dual laminates with two printed surfaces comprise two substrates, each with printed indicia which are laminated together to form a single unitary product. Each foil laminate consists of a plastic printed stock of 13 mil PVC 10 and 20, printing 13 and 23, and metal foil, 12 and 22, with heat activation adhesive, 11 and 21, the two laminates collated and laminated together with over-laminated film 17 of PVC of about 2 mil. The metal foil and PVC substrates are in the form of large sheets of the thickness described. Multiple printed indicia are printed on the metal foil of each foil dual laminates. A plurality of individual dual foil laminates can be die cut to card size from the large laminated sheets after the over-laminating film 17 is applied. The individual cards can be further finished by embossing, application of signature panels or holograms, etc., including each segment with an applied scratch-off or "ultra-graphic indicia" to enhance appearance or utility.

The method of making the multi-surfaced credit card dual foil laminate having at least two printed surfaces, each surface of printed metal foil, is shown in FIG. 4 in a block diagram, in the preparation of a dual metal foil credit card with dual metal surfaces using standard offset half tone lithography printing on a sheet fed press and finished with standard methods at temperatures within the range of from 250° F. to 310° F. with polished plates in the laminating step with a short dwell time of from 6 to 8 minutes under pressure of 800 to 1500 p.s.i.

Referring now to FIG. 4, the drawing is for the purpose of illuminating a second embodiment of the invention and not for the purpose of limiting the invention. FIG. 4 shows a block diagram illustrating the basic steps of the method of making an embodiment of the present invented credit card with a dual foil laminate having at least two printed surfaces, each surface of printed metal foil.

As referred to earlier, the steps of preparing the printed metal foil on the PVC substrate are utilized to prepare the second printed metal foil upon the PVC substrate, basis the same limitations and method requirements as previously specified for making the unitary foil laminate illuminated in FIGS. 1 and 2, and described earlier, utilizing the same procedures, same component materials. FIGS. 3 and 4 illustrate a second embodiment of the invented credit card, wherein a metal foil laminate prepared as taught and illustrated in FIGS. 1 and 2 and described in preceding paragraphs of this description of this invention, is bonded to a second metal foil laminate prepared as described and illustrated in preceding paragraphs.

Figure 5:
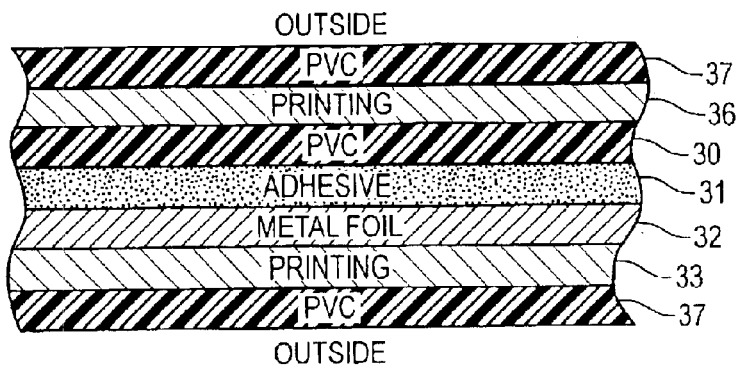
FIG. 5 is a cross-sectional view of an alternative embodiment of the present invention of the multi surface foil credit card having two printed surfaces, one surface being a PVC film substrate with printing on a first side and a printed metal foil adhering to a second side, the printed PVC substrate and the printed metal foil adhering to a second side being laminated over with an over-laminating PVC film.
Figure 6:
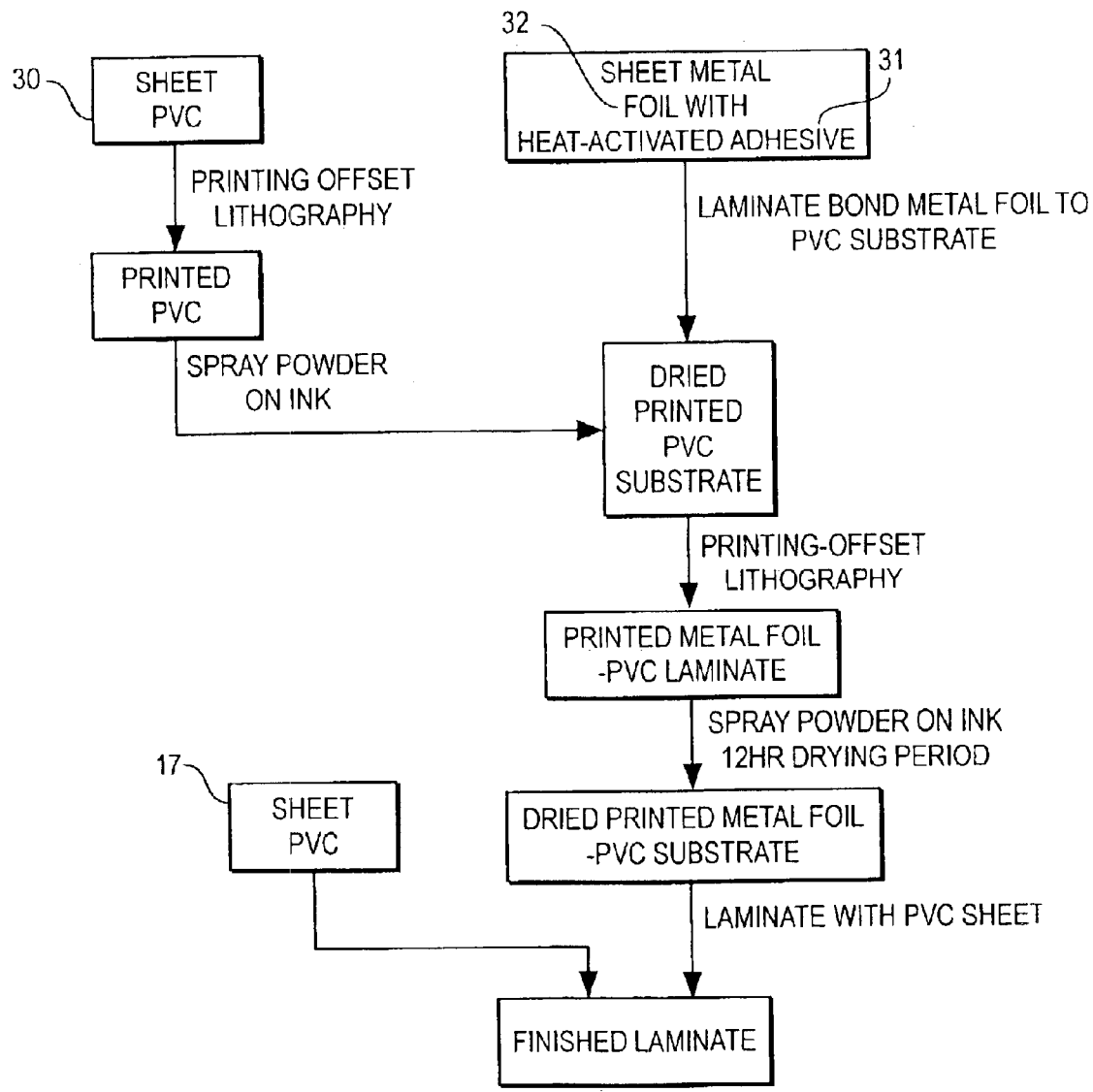
FIG. 6 is a block diagram representing the steps of an alternative embodiment of the present invention of the multi surface foil credit card having two printed surfaces, one surface being a PVC film substrate with printing on a first side and a printed metal foil adhering to a second side, the printed PVC substrate and printed metal foil adhering to a second side being laminated over with an over-laminating PVC film.

Referring now to drawings, FIGS. 5 and 6, FIG. 5 is a cross-sectional view of the multi-surfaced metal foil laminate credit card wherein the thickness of the foil laminate has been enlarged for illustration purposes. The foil laminate with two printed surfaces comprise one substrate of PVC film 30 with printed indicia 36 on a first surface and a printed metal foil 32 adhering with heat activated adhesive 31 to a second side of the PVC substrate, 30, the printed PVC substrate, 30 and 36, and printed metal foil, 32 and 33, laminated together with over-laminating PVC film 37 as the external surfaces of the multi-surfaced metal foil laminate credit card to form a single unitary product. Each foil laminate consists of a plastic printed stock of 24 to 28 mil thickness, preferably about 26 mil and with specified surface roughness to provide an improved printability. The over-laminating film for laminating the printed PVC substrate and the printed metal foil adhering to the PVC substrate can include over-laminating PVC sheets manufactured by Empire® or Nanya® where the film thickness is within the range of from 1 mil to about 6 mil, preferably about 2 mil. The metal foil and PVC substrate are in the form of large sheets of the thickness described. The substrate PVC sheet 30 and the substrate metal foil 32 as a laminate surface adhering to PVC sheet 30 by adhesive 31 are printed separately using a conventional offset lithography process. The metal foil is initially provided as a continuous sheet or web from a suitable supply roll or the like which has one surface of the sheet provided with a suitable adhesive so as to adhesively contact and be bonded to the plastic substrate, preferably a clear PVC film of 26 mil thickness to provide support for the metal foil without cracking during the printing step. The PVC film, in turn, is adapted to be bonded to the metal foil by possessing a dyne level of 36 or more above the energy level and a surface roughness measured in microinches by an RA meter within the range of 60 to 90 RA, defined as roughness average of the surface of the plastic, measured with an RA meter.

Referring to FIG. 6, initially, multiple printed indicia 36 are printed onto the PVC 30 first surface, the printed first surface being spray powdered to coat the printed surfaces and allow the PVC sheets to be handled during a suitable drying period of approximately twelve hours or less. Further referring to FIG. 6, the sheet metal foil 32 with heat-activated adhesive 31 on one surface is bonded to the dried PVC on the PVC second surface. The metal foil 32 bonded by adhesive 31 to PVC sheet 30 is printed by off-set lithography, the printed metal foil being spray powdered to coat the printed surface, and this allows the printed metal foil on the printed PVC substrate to be handled during a suitable drying period. The dried printed metal foil on the printed PVC substrate is over-laminated with an over-laminating PVC film 37. The laminate is die cut to required size and finished by embossing or further post processing as required.

The foregoing description is of specific embodiments of the present invention. It should be appreciated that these embodiments are described for purposes of illustration only and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A multi-surfaced foil laminate having printed indicia visible on both sides through a clear plastic over-laminating film, said indicia printed in at least one color on the outer visible surfaces of said laminate, said printed indicia by lithography offset 133 to 300 line screen halftone printing wherein spray powder coated on the printed surfaces helps dry the printing inks, provides space for drying, wherein said multi surfaced foil laminate comprises two printed surfaces exteriorly visible through an exterior transparent plastic film, one printed surface comprising a printed plastic film sheet substrate and a second printed surface comprising metal foil adhering to a plastic film sheet substrate, said metal foil printed on the non-adherent side and serving an outside printed surface, said surfaces providing identifying indicia through said exterior transparent plastic film, said plastic film sheet substrate and said exterior transparent plastic film comprising PVC, said metal foil selected from the group consisting of aluminum, gold, silver and bronze, said multi-surfaced foil laminate severed into predetermined segments.

2. The multi-surfaced foil laminate of claim 1 wherein said two printed surfaces comprise two layers of said laminate, a first layer comprising a printed plastic film sheet film providing identifying indicia through an exterior transparent plastic film, said printed plastic film sheet substrate comprising PVC, a second layer comprising a printed metal foil adhering to a plastic film sheet substrate providing identifying indicia through said transparent plastic film.

3. The multi-surfaced foil laminate of claim 1 wherein said two printed surfaces individually comprise two layers of said laminate, said two layers individually comprising a printed metal foil adhering to a plastic film substrate providing identifying indicia through said transparent plastic film.

4. The multi-surfaced foil laminate of claim 1 wherein said two printed surfaces comprise a laminate comprising a printed metal foil adhering to a first side of a plastic film substrate, said plastic film substrate printed with identifying indicia on a second side of said plastic film substrate, providing said identifying indicia through said transparent plastic film.

5. The multi-surfaced foil laminate of claim 1 wherein said metal foil is aluminum.

6. The multi-surfaced foil laminate of claim 1 wherein said identifying indicia further comprises identifying information means located on said laminate.

7. The multi-surfaced foil laminate as claimed in claim 5 wherein said identifying information means is a magnetic tape which is attached to said laminate on a surface providing identifying indicia through an exterior transparent plastic film.

8. The multi-surfaced foil laminate of claim 1 wherein said multi-surfaced foil laminate is severed into predetermined segments to serve as credit cards, gift cards, and identification cards, each segment having printing located on each outer side.

9. The multi-surfaced foil laminate of claim 1 wherein said metal foil is of an overall thickness of about 0.05 to 1.50 mm.

10. The multi-surfaced foil laminate of claim 1 wherein said plastic film sheets substrates are of a thickness within the range of from 8 to 28 mil.

11. The multi-surfaced foil laminate of claim 1 wherein said exterior transparent plastic film is clear PVC film of a thickness within the range of from 1.5 to 2.5 mil.

12. The multi-surfaced foil laminate of claim 1 wherein said printed indicia is by lithography offset 175 line screen halftone printing.

13. The multi-surfaced foil laminate of claim 1 wherein laminating step has a dwell time of from 6 to 8 minutes under pressure of 800 to 1500 p.s.i.

14. A multi-layered foil laminate comprising a foil laminate having two printed surfaces visible on both sides through a clear plastic over laminating film, said printed surfaces in at least one color on the outer visible surfaces of said laminate, said printed surfaces comprising a first plastic surface comprising a plastic film material, said printed surfaces comprising a metal foil as a second surface, said printed surfaces by lithography offset halftone printing, said clear plastic over-laminating film and said plastic film material comprising PVC and said metal foil comprising aluminum, said multi-layered foil laminate severed into predetermined segments, said metal foil adhered to said first plastic film by an adhesive.

* * * * *